(12) United States Patent
Nader

(10) Patent No.: US 8,855,632 B2
(45) Date of Patent: Oct. 7, 2014

(54) MEASUREMENT TERMINATION OF HIGHER-PRIORITIZED LAYERS FOR PRIORITY-BASED CELL RESELECTION ALGORITHMS IN CELLULAR COMMUNICATION SYSTEMS

(75) Inventor: Ali Nader, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 430 days.

(21) Appl. No.: 13/369,380

(22) Filed: Feb. 9, 2012

(65) Prior Publication Data

US 2013/0210441 A1 Aug. 15, 2013

(51) Int. Cl.
*H04W 4/00* (2009.01)
*H04W 36/00* (2009.01)
*H04W 36/36* (2009.01)
*H04B 17/00* (2006.01)
*H04B 1/76* (2006.01)
*H04J 1/16* (2006.01)

(52) U.S. Cl.
USPC ........ 455/434; 455/436; 455/423; 455/67.11; 455/161.11; 370/241; 370/331

(58) Field of Classification Search
CPC . H04W 24/00; H04W 36/0083; H04W 36/30; H04W 48/18; H04W 36/0094; H04W 36/14; H04W 36/04; H04W 36/06; H04W 36/24; H04W 52/245; H04W 72/085; H04W 76/028; H04B 17/0042; H04B 17/0067; H04L 5/006
USPC ............. 455/423, 67.11, 67.16, 435.1–435.3, 455/436–444, 434, 161.1–161.3, 69; 370/331, 332, 241, 252
See application file for complete search history.

(56) References Cited

U.S. PATENT DOCUMENTS 6,067,460 A * 5/2000 Alanara et al. ................ 455/574
8,472,407 B2 * 6/2013 Iwamura et al. .............. 370/332

(Continued)

FOREIGN PATENT DOCUMENTS

EP 1804532 A1 7/2007
EP 2073576 A1 6/2009

(Continued)

OTHER PUBLICATIONS

PCT International Search Report, mailed May 3, 2013, in connection with International Application No. PCT/EP2013/052140 (all pages).

(Continued)

*Primary Examiner* — Matthew Sams
(74) *Attorney, Agent, or Firm* — Leffler Intellectual Property Law, PLLC; Kenneth B. Leffler

(57) ABSTRACT

A user equipment (UE) is operated in a cellular communication system in which radiofrequency resources are partitioned into layers, each layer being associated with one of a set of hierarchical priority levels. While camped on a serving cell whose signals are transmitted on a first layer associated with a first priority level, the UE repeatedly measures a characteristic of a second layer that is present within its surroundings and generates from these measurements a plurality of measured surroundings data, wherein the second layer is associated with a second priority level that is higher than the first priority level. The UE ceases measuring the characteristic of the second layer that is present within the UE's surroundings in response to detecting both that at least one of the measured surroundings data is less than a predetermined threshold level and that a trend of the measured surroundings data is negative.

19 Claims, 8 Drawing Sheets

(56) References Cited

U.S. PATENT DOCUMENTS

| | | | |
|---|---|---|---|
| 8,553,563 B2* | 10/2013 | Suzuki et al. | 370/241 |
| 8,706,115 B2* | 4/2014 | Pani et al. | 455/436 |
| 8,731,554 B2* | 5/2014 | Yoshihara et al. | 455/435.2 |
| 2006/0246895 A1* | 11/2006 | Ryu | 455/434 |

FOREIGN PATENT DOCUMENTS

| | | |
|---|---|---|
| EP | 2262310 A1 | 12/2010 |
| WO | 2008157573 A1 | 12/2008 |
| WO | 2009007720 A2 | 1/2009 |
| WO | 2010092049 A1 | 8/2010 |

OTHER PUBLICATIONS

PCT Written Opinion, mailed May 3, 2013, in connection with International Application No. PCT/EP2013/052140 (all pages).

3GPP Technical Specification 36.133, V10.5.0, "Requirements for support of radio resource management (Release 10)" Jan. 6, 2012, pp. 1-544, XP050555207.

3GPP Technical Specification 36.304, V10.4.0, "User Equipment (UE) procedures in idle mode (Release 10)" Dec. 20, 2011, pp. 1-33, XP050554955.

3GPP TS 36.201, V10.0.0 Technical Specification Group Radio Access Network; Evolved Universal Terrestrial Radio Access (E-UTRA); LTE physical layer; General description (Release 10), Third Generation Partnership Project, Dec. 2010.

3GPP TSG Ran WG4 (Radio) Meeting #46, Sorrento, Italy, Feb. 11-15, 2008, R4-080326, Third Generation Partnership Project, 650 Route des Lucioles, F-06921 Sophia-Antipolis Cedex, France.

3GPP TS 36.521-3, Version 8.0.1 "LTE; Evolved Universal Terrestrial Radio Access (E-UTRA); User Equipment (UE) conformance specification; Radio transmission and reception; Part 3: Radio Resource Management (RRM) conformance testing", Release 8, Third Generation Partnership Project, Jun. 2009.

3GPP TS 45.008, V8.13.0 Technical Specification Group GSM/EDGE Radio Access Network; Radio subsystem link control (Release 8), Nov. 2011.

3GPP TS 25.331, V8.17.0 Technical Specification Group Radio Access Network; Radio Resource Control (RRC); Protocol specification (Release 8), Dec. 2011.

3GPP TS 25.304, V8.12.0 Technical Specification Group Radio Access Network; User Equipment (UE) procedures in idle mode and procedures for cell reselection in connected mode (Release 8), Jun. 2011.

3GPP TS 25.133, Version 8.15.0 Technical Specification Group Radio Access Network; Requirements for support of radio resource management (FDD) (Release 8), Sep. 2011.

3GPP TS 36.331, V8.16.0 Technical Specification Group Radio Access Network; Evolved Universal Terrestrial Radio Access (E-UTRA); Radio Resource Control (RRC); Protocol specification (Release 8), Dec. 2011.

3GPP TS 36.304, Version 8.10.0 Technical Specification Group Radio Access Network; Evolved Universal Terrestrial Radio Access (E-UTRA); User Equipment (UE) procedures in idle mode (Release 8), Jun. 2011.

3GPP TS 36.133, Version 8.16.0 Technical Specification Group Radio Access Network; Evolved Universal Terrestrial Radio Access (E-UTRA); Requirements for support of radio resource management (Release 8), Dec. 2011.

* cited by examiner

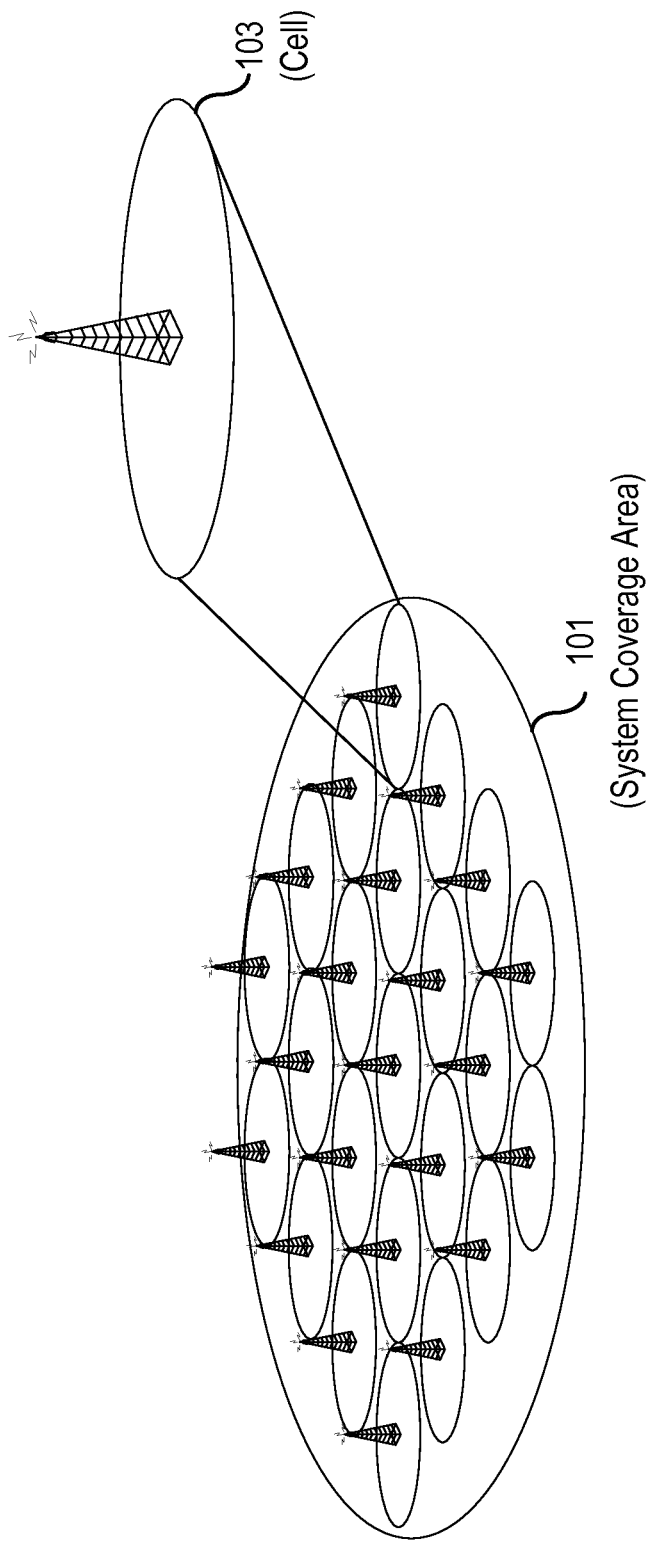
FIG. 1
(PriorArt)

MEASUREMENT TERMINATION OF HIGHER-PRIORITIZED LAYERS FOR PRIORITY-BASED CELL RESELECTION ALGORITHMS IN CELLULAR COMMUNICATION SYSTEMS

BACKGROUND

The present invention relates to cellular communication systems, more particularly to cellular communication systems that partition subcarriers into a hierarchy of prioritized layers, and even more particularly the termination of measurement-taking of higher-prioritized layers for priority-based cell reselection algorithms.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often generically referred to as "base stations", even when particular communication standards setting bodies apply different terminology (e.g., "NodeB" in WCDMA, and "eNodeB" in LTE) for the purpose of very precisely pointing out the distinctive capabilities and architectures of their version of the base station. As the mobile device moves from one cell to another, the network hands over responsibility for serving the mobile device from the presently-serving cell to the "new" cell. In this way, the user of the mobile device experiences continuity of service without having to reestablish a connection to the network. Handovers are controlled by a system-defined cell reselection mechanism. FIG. 1 illustrates a cellular communication system providing a system coverage area 101 by means of a plurality of cells 103.

The radiofrequency spectrum that is utilized to provide mobile communication services is a limited resource that must be shared in some way among all of the users in a system. Therefore, a number of strategies have been developed to prevent one mobile device's use (both transmitting and receiving) of radio spectrum from interfering with that of another, as well as to prevent one cell's communications from interfering with those of another. Some strategies, such as Frequency Division Multiple Access (FDMA) involve allocating certain frequencies to one user to the exclusion of others. Other strategies, such as Time Division Multiple Access (TDMA) involve allowing multiple users to share one or more frequencies, with each user being granted exclusive use of the frequencies only at certain times that are unique to that user. FDMA and TDMA strategies are not mutually exclusive of one another, and many systems employ both strategies together, one example being the Global System for Mobile communication (GSM).

As designers strive to develop systems with higher and higher capabilities (e.g., higher communication speeds, resistance to interference, higher system capacity, etc.), different technical features are incorporated, including different means for sharing radiofrequency resources. To take one of a number of possible examples, the Evolved-Universal Terrestrial Radio Access Network (E-UTRAN) Long Term Evolution (LTE) technology, as defined by 3GPP TR 36.201, "Evolved Universal Terrestrial Radio Access (E-UTRA); Long Term Evolution (LTE) physical layer; General description" will be able to operate over a very wide span of operating bandwidths and also carrier frequencies. Furthermore, E-UTRAN systems will be capable of operating within a large range of distances, from microcells (i.e., cells served by low power base stations that cover a limited area, such as a shopping center or other building accessible to the public) up to macrocells having a range that extends up to 100 km. In order to handle the different radio conditions that may occur in the different applications, Orthogonal Frequency Division Multiple Access (OFDMA) technology is used in the downlink (i.e., the communications link from the base station to the User Equipment—"UE") because it is a radio access technology that can adapt very well to different propagation conditions. In OFDMA, the available data stream is portioned out into a number of narrowband subcarriers that are transmitted in parallel. Because each subcarrier is narrowband it only experiences flat-fading. This makes it very easy to demodulate each subcarrier at the receiver.

In the Release 8 version of the 3GPP specifications, a new concept of layers was introduced wherein a layer is an LTE/WCDMA frequency carrier or a set of GSM frequency carriers. Each layer is assigned a certain priority out of a set of hierarchical priority levels, so that some layers can be considered to have a higher (or lower) priority than others. It is further noted that a layer can be associated with one or a plurality of cells. Consequently, the layer associated with a UE's serving cell can also be associated with other, non-serving cells.

Along with the concept of layers, the Release 8 version of the 3GPP specifications also introduced a new cell reselection mechanism that is based on the priorities. This is called priority-based cell reselection. Details of layers, priorities, and corresponding algorithms that govern when to reselect to a cell belonging to a layer of a certain priority is given in the following 3GPP specifications:

GSM 45.008
WCDMA 25.331, 25.304, 25.133
LTE 36.331, 36.304, 36.133

Apart from the reselection algorithms, these specifications also specify when a User Equipment (UE) shall measure, and also when a UE may omit measuring, a certain layer.

Although the ideas presented herein are applicable to systems conforming with any of the GSM, WCDMA, and LTE standards, for the sake of simplicity, this description will use as examples concepts and terminology associated with LTE. This should not, in any way, be construed as an implication that the various technical aspects of embodiments consistent with the invention are limited only to LTE-conforming systems, however. To the contrary, these technical aspects are applicable to any of the above-mentioned as well as other systems.

In the LTE specification (3GPP 36.304/36.133), rules are set forth that are to be used by the UE to limit those measurements that guide cell reselection. Rule decisions are based on a measured value, Srxlev (a radio quality measurement of the serving cell defined in 3GPP 36.304 and based on Reference Signal Received Power—"RSRP"), and also on a measured value, Squal (a radio quality measurement of the serving cell defined in 3GPP 36.304 based on Reference Signal Received Quality—"RSRQ"). These rules can be paraphrased as follows (the symbol "&&" represents the Boolean "AND" operation):

The UE may omit measurements of frequencies within the same layer as that which is associated with its serving cell if Srxlev>Sintrasearch_rsrp_threshold && Squal>Sintrasearch_rsrq_threshold The UE may omit measurements of frequencies within other layers of equal or lower priority as the layer of the serving cell if Srxlev>Sintersearch_rsrp_threshold && Squal>Sintersearch_rsrq_threshold where Sintrasearch_rsrp_threshold, Sintrasearch_rsrq_threshold, Sintersearch_rsrp_threshold, and Sintersearch_rsrq_threshold are each system-defined threshold values.

When it comes to layers of higher priority than that of the current layer, the specifications call for the UE to measure such layers at least once every 60×NumberOfLayers seconds, and if the UE notes that no cell reselection is to take place, then the UE may stop making measurements on such layers. In this case, determining that no cell reselection is to take place is based on RSRP and RSRQ measurements of the higher priority layer. For each of these, at least two measurements are filtered, the measurements being spaced apart by at least a predetermined time interval. For each of the filtered RSRP and RSRQ measurements, the UE ascertains whether the filtered measurement has fallen below a predefined reselection threshold level. If this is the case for either one of them (i.e., the filtered RSRP measurement or the filtered RSRQ measurement), then no cell reselection is to take place and measurement-taking of the higher-priority layer can cease.

The inventor of the subject matter described herein has recognized that the conventional mechanism for determining when measurements of higher priority layers can cease can often result in the UE making premature decisions that no cell reselection can take place when, in fact, conditions are such that cell reselection would be appropriate. This in turn results in inefficient performance, both at the system and UE level. It is therefore desired to have improved mechanisms for determining when to cease making measurements of higher priority layers.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a user equipment in a cellular communication system in which radiofrequency resources are partitioned into layers, each layer being associated with one of a set of hierarchical priority levels. Such operation comprises, while camped on a serving cell whose signals are transmitted on a first layer associated with a first priority level, repeatedly measuring a characteristic of a second layer that is present within the surroundings of the user equipment and generating from these measurements a plurality of measured surroundings data, wherein the second layer is associated with a second priority level that is higher than the first priority level. Measuring the characteristic of the second layer that is present within the surroundings of the user equipment is ceased in response to detecting both that at least one of the measured surroundings data is less than a predetermined threshold level and that a trend of the plurality of measured surroundings data is negative.

In an aspect of some embodiments consistent with the invention, each of the plurality of measured surroundings data is generated by filtering a plurality of initial measured surroundings data.

In an aspect of some embodiments consistent with the invention, measuring the characteristic of the second layer that is present within the surroundings of the user equipment is performed only if at least one non-serving cell associated with the second layer is an allowed candidate for cell reselection by the user equipment within the cellular communication system.

In an aspect of some embodiments consistent with the invention, the user equipment's surroundings include signals transmitted by a plurality of non-serving cells all associated with the second layer. One of the plurality of non-serving cells all associated with the second layer is defined as a best non-serving cell as a result of that non-serving cell's signals coming closest to satisfying one or more predetermined criteria. Each of the measured surroundings data represents a measured value of the best non-serving cell in the user equipment's surroundings.

In an aspect of some embodiments consistent with the invention, the user equipment's surroundings include signals transmitted by a plurality of non-serving cells all associated with the second layer, and a predefined plural number but not all of the plurality of non-serving cells all associated with the second layer are defined as best non-serving cells as a result of those non-serving cell's signals coming closest to satisfying one or more predetermined criteria. Each of the measured surroundings data represents an average of measured values of the predefined plural number of best non-serving cells in the user equipment's surroundings.

In an aspect of some embodiments consistent with the invention, the user equipment's surroundings include signals transmitted by a plurality of non-serving cells all associated with the second layer; and a predefined plural number but not all of the plurality of non-serving cells all associated with the second layer are defined as best non-serving cells as a result of those non-serving cell's signals coming closest to satisfying one or more predetermined criteria. Each of the measured surroundings data represents a weighted average of measured values of the predefined plural number of best non-serving cells in the user equipment's surroundings.

In an aspect of some embodiments consistent with the invention, the user equipment's surroundings include signals transmitted by a plurality of non-serving cells all associated with the second layer; and a predefined plural number but not all of the plurality of non-serving cells all associated with the second layer are defined as best non-serving cells as a result of those non-serving cell's signals coming closest to satisfying one or more predetermined criteria. Each of the measured surroundings data represents a weighted sum of measured values of the predefined plural number of best non-serving cells in the user equipment's surroundings.

In an aspect of some embodiments consistent with the invention, the predetermined threshold level is lower than a threshold level mandated by the cellular communication system.

In an aspect of some embodiments consistent with the invention, the user equipment's surroundings include signals transmitted by a plurality of non-serving cells all associated with the second layer; and one of the plurality of non-serving cells all associated with the second layer is defined as a best non-serving cell as a result of that non-serving cell's signals coming closest to satisfying one or more predetermined criteria. Detecting that at least one of the measured surroundings data is less than the predetermined threshold level consists of detecting that measured surroundings data from the best non-serving cell is less than the predetermined threshold level.

In an aspect of some embodiments consistent with the invention, the user equipment's surroundings include signals transmitted by a plurality of non-serving cells all associated with the second layer; and one of the plurality of non-serving cells all associated with the second layer is defined as a best non-serving cell as a result of that non-serving cell's signals coming closest to satisfying one or more predetermined criteria. Detecting that the trend of the plurality of measured surroundings data is negative consists of detecting that the trend of the plurality of measured surroundings data from the best non-serving cell is negative.

BRIEF DESCRIPTION OF THE DRAWINGS

FIG. 1 illustrates a cellular communication system providing a system coverage area by means of a plurality of cells.

DETAILED DESCRIPTION

Figure 2:
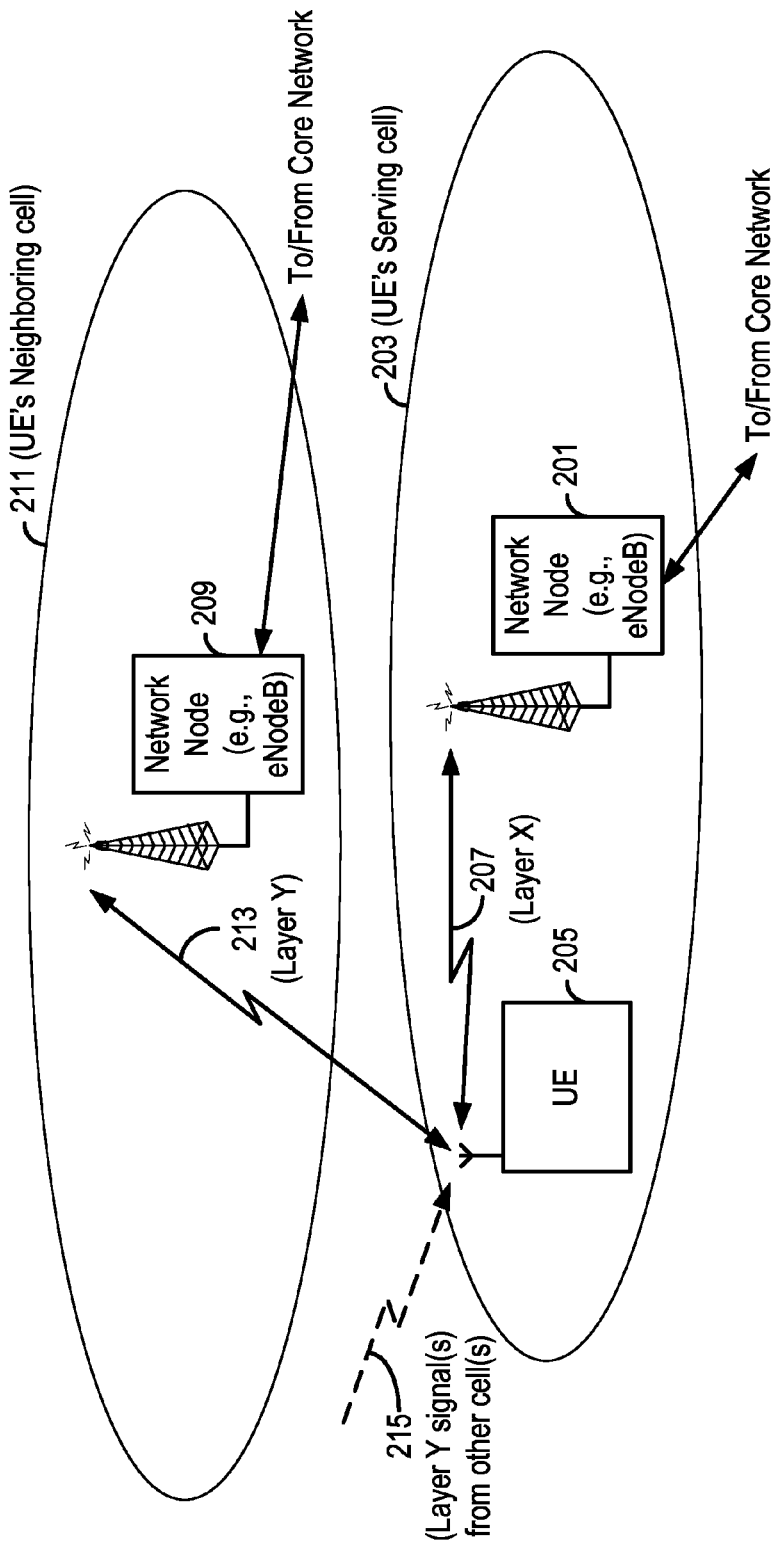
FIG. 2 illustrates a UE that is operated in accordance with some aspects of the invention so as to make improved decisions regarding the measurements of higher priority layers in a cellular communication system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a UE's cell reselection mechanism includes observing the trend, rather than instantaneous values, of the UE's measured surroundings on a given higher prioritized layer and on that basis deciding for how long the measurements on the given layer should continue. In this respect, and throughout this document, the term "measured surroundings" is defined to include, without limitation, any one or combination of the following:

a measured value of the best non-serving cell in the UE's surroundings an average of measured values of some predefined plural number of the best non-serving surrounding cells a weighted average of measured values of some predefined plural number of the best non-serving surrounding cells a weighted sum of measured values of some predefined plural number of the best non-serving surrounding cells The above possibilities are presented as examples, and are not intended to portray all possible values that could constitute the "measured surroundings" in the context of the invention. It will be observed that in all cases, "measured surroundings" refers only to measurements made on signals transmitted by non-serving cells in the vicinity of a UE. Signals transmitted by a UE's own serving cell do not constitute any part of that UE's measured surroundings. This also illustrates the relative nature of what constitutes "measured surroundings": one UE's measured surroundings can be different from those of another UE if they do not share the same serving cell.

The discussion will first focus on the inventor's own analysis of behaviors that can result from following the rules set forth in the existing 3GPP specifications. Problems with this behavior will thereby be made apparent to the reader. Aspects of embodiments consistent with the invention that address these problems are then described in greater detail.

Looking first at FIG. 2, this is an illustration of a network node 201 (e.g., an LTE eNodeB) that supports a cell 203. A UE 205 is located within the cell 203 and is connected to (camped on) the network node 201, so that the cell 203 is the UE's serving cell. The signals 207 that the network node 201 transmits to the UE 205 are associated with a layer having a given priority, herein referred to as "Layer X".

Another node 209 supports a neighboring cell 211. It is recognized that in some systems, such as WCDMA and LTE systems, a single network node can support more than one cell, which creates the possibility that the nodes 201 and 209 may be, but are not necessarily, the same node. Even in that case, however, the cells 203 and 211 supported by that single node can be associated with different layers. For simplicity of illustration, however, FIG. 2 depicts two separate nodes.

The UE 205 is close enough to the neighboring cell 211 to be able to receive that cell's signals 213, which are associated with a layer having a given priority, herein referred to as "Layer Y". It is also possible that another nearby cell is transmitting signals 215 associated with Layer Y, and that the UE can receive these as well. Accordingly, the UE will make measurements on the signal 213 (and possibly also on the signal 215 if it is present) as part of its measurement of "measured surroundings." (Note that the signal 207 is not part of the UE's measured surroundings because it is transmitted by the UE's own serving cell 203.) The layer "Y" may have any relation with respect to layer "X"; that is, it may be a higher priority, equal priority, or lower priority layer. The following discussion considers the case in which Layer Y is of a higher priority than Layer X.

Figure 3:
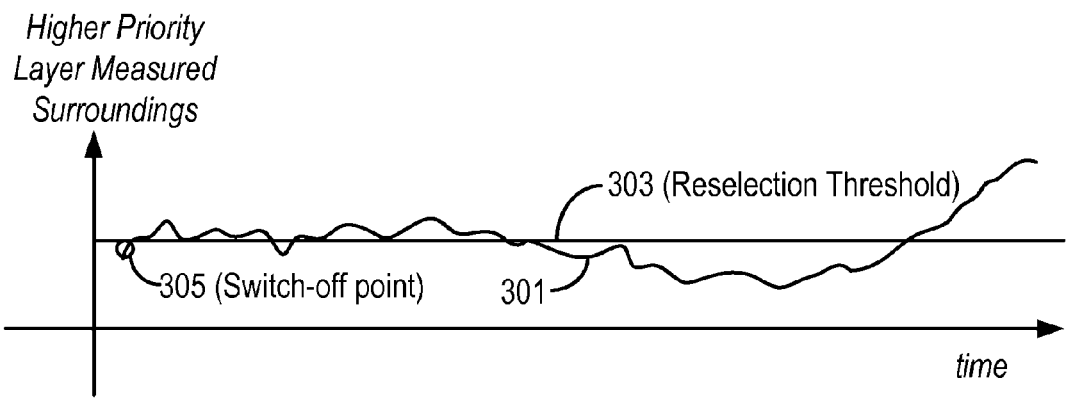
FIG. 3 illustrates a graph of a UE's hypothetical higher priority layer measured surroundings plotted as a function of time.

FIG. 3 illustrates a graph 301 of a UE's hypothetical higher priority layer measured surroundings plotted as a function of time. The inventor of the subject matter described herein created this and all other hypothetical measurements depicted herein as part of his analysis to find problems with the conventional techniques and to create solutions to these problems. The measurement may be, for example, a filtered RSRP measurement or a filtered RSRQ measurement. A system defined (and therefore predetermined) reselection threshold 303 is also shown. According to conventional rules that apply to measurements of higher-priority cells, if the measured surroundings fall below the reselection threshold 303, then the UE is to assume that no reselection will take place. Accordingly, the UE is to stop making further measurements of the higher priority cell. In the example of FIG. 3, the initial measurements are below the reselection threshold 303 at the very start. Accordingly, the UE will switch off any further measurement taking of this cell right at the outset, at the switch-off point 305.

Under these circumstances, the conventional rules do not result in the UE making the best decision with respect to whether to continue measuring the higher priority layer because the measured surroundings 301 are not really worsening, but instead bounces above and below the reselection threshold for a while before making a strong trend upward. Reselection to this layer may, in fact, be a good choice, but the UE will never have a chance to detect this because its measurement taking will have stopped at the early switch-off point 305.

Figure 4:
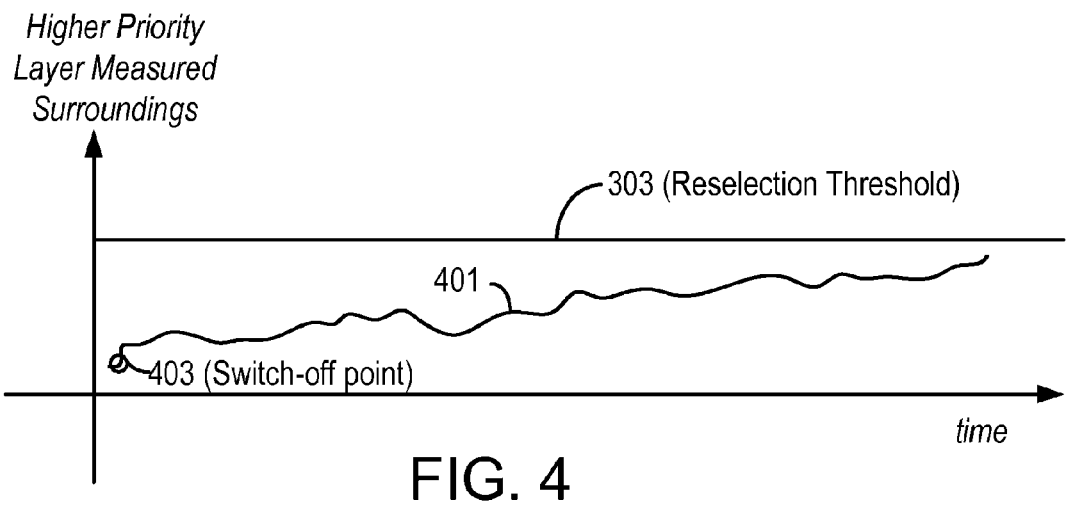
FIG. 4 illustrates a graph of a UE's hypothetical higher priority layer measured surroundings plotted as a function of time.

FIG. 4 illustrates another graph 401 of a UE's hypothetical higher priority layer measured surroundings plotted as a function of time. As before, the measurement may be, for example, a filtered RSRP measurement or a filtered RSRQ measurement. The system defined (and therefore predetermined) reselection threshold 303 is also shown. This case also presents problems. According to the conventional rules that apply to measurements of higher-priority cells, in the example of FIG. 4, the initial measurements are below the reselection threshold 303 at the very start. Accordingly, the UE will switch off any further measurement taking of this cell right at the outset, at the switch-off point 403.

Under these circumstances, the conventional rules do not result in the UE making the best decision with respect to whether to continue measuring the higher priority layer because the measured surroundings 401 are exhibiting a strong trend upward. Reselection to this layer may, in fact, be a good choice if the measured surroundings 401 cross the reselection threshold 303, but the UE will never have a chance to detect this because its measurement taking will have stopped at the very early switch-off point 403.

Figure 5:
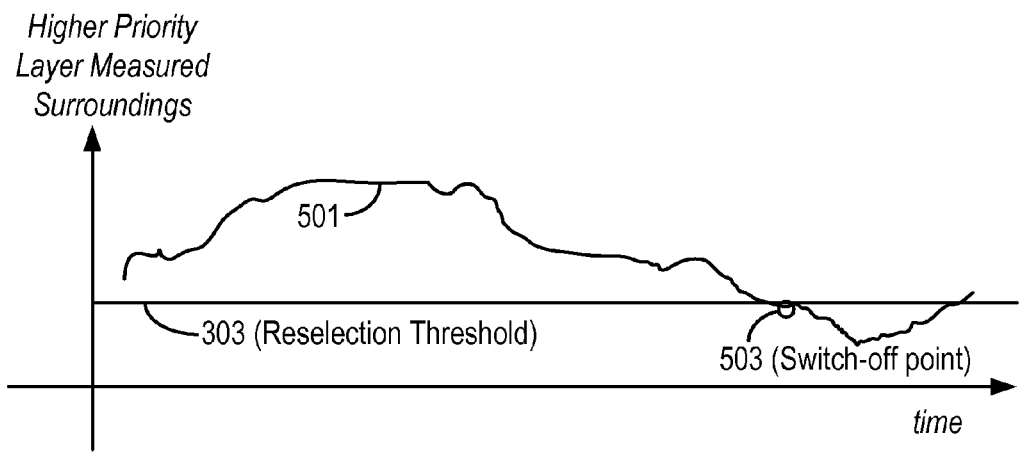
FIG. 5 illustrates a graph of a UE's hypothetical higher priority layer measured surroundings plotted as a function of time.

FIG. 5 illustrates another graph 501 of a UE's hypothetical higher priority layer measured surroundings plotted as a function of time. As before, the measurement may be, for example, a filtered RSRP measurement or a filtered RSRQ measurement. The system defined (and therefore predetermined) reselection threshold 303 is also shown. According to the conventional rules that apply to measurements of higher-priority cells, in the example of FIG. 5, the initial measurements are above the reselection threshold 303 at the very start, and continue above it for a long while, although the measurement curve 501 is trending negative. When the measured surroundings 501 dip below the reselection threshold 303, the conventional rules call for the UE to switch off any further measurement taking of this cell at the switch-off point 503.

Under these circumstances, the conventional rules do not result in the UE making the best decision with respect to whether to continue measuring the higher priority layer because the measured surroundings 501 are, for the most part, above the reselection threshold 303. There is a short dip below the reselection threshold 303, but the conventional rules prevent the UE from discovering that this dip is short-lived, and is followed by a positive trend that results in measurement values back above the reselection threshold 303. Reselection to this layer may, in fact, be a good choice but the UE will never have a chance to detect this because its measurement taking will have stopped at the switch-off point 503.

Figure 6:
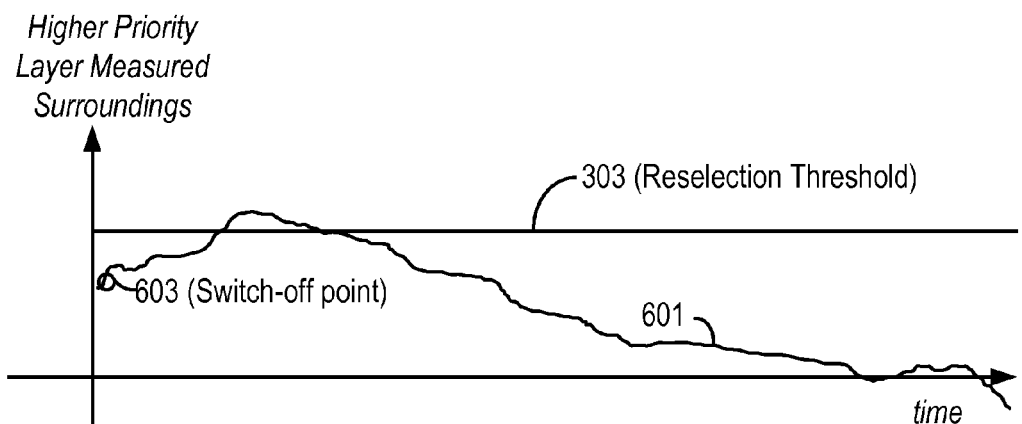
FIG. 6 illustrates a graph of a UE's hypothetical higher priority layer measured surroundings plotted as a function of time.

FIG. 6 illustrates another graph 601 of a UE's hypothetical higher priority layer measured surroundings plotted as a function of time. As before, the measurement may be, for example, a filtered RSRP measurement or a filtered RSRQ measurement. The system defined (and therefore predetermined) reselection threshold 303 is also shown. According to the conventional rules that apply to measurements of higher-priority cells, in the example of FIG. 6, the initial measurements are below the reselection threshold 303 at the very start. Accordingly, the UE will switch off any further measurement taking of this cell right at the outset, at the switch-off point 603. This turns out not to be a problem, however, because the measurements, examined over a sufficient amount of time, show that this cell would be a poor candidate for cell reselection due to the worsening over time of the signal measurement.

It will be observed that the conventional rules resulted in less-than-ideal decision making with respect to the examples shown in FIGS. 3, 4, and 5. The following description presents embodiments that address these problems.

Figure 7:
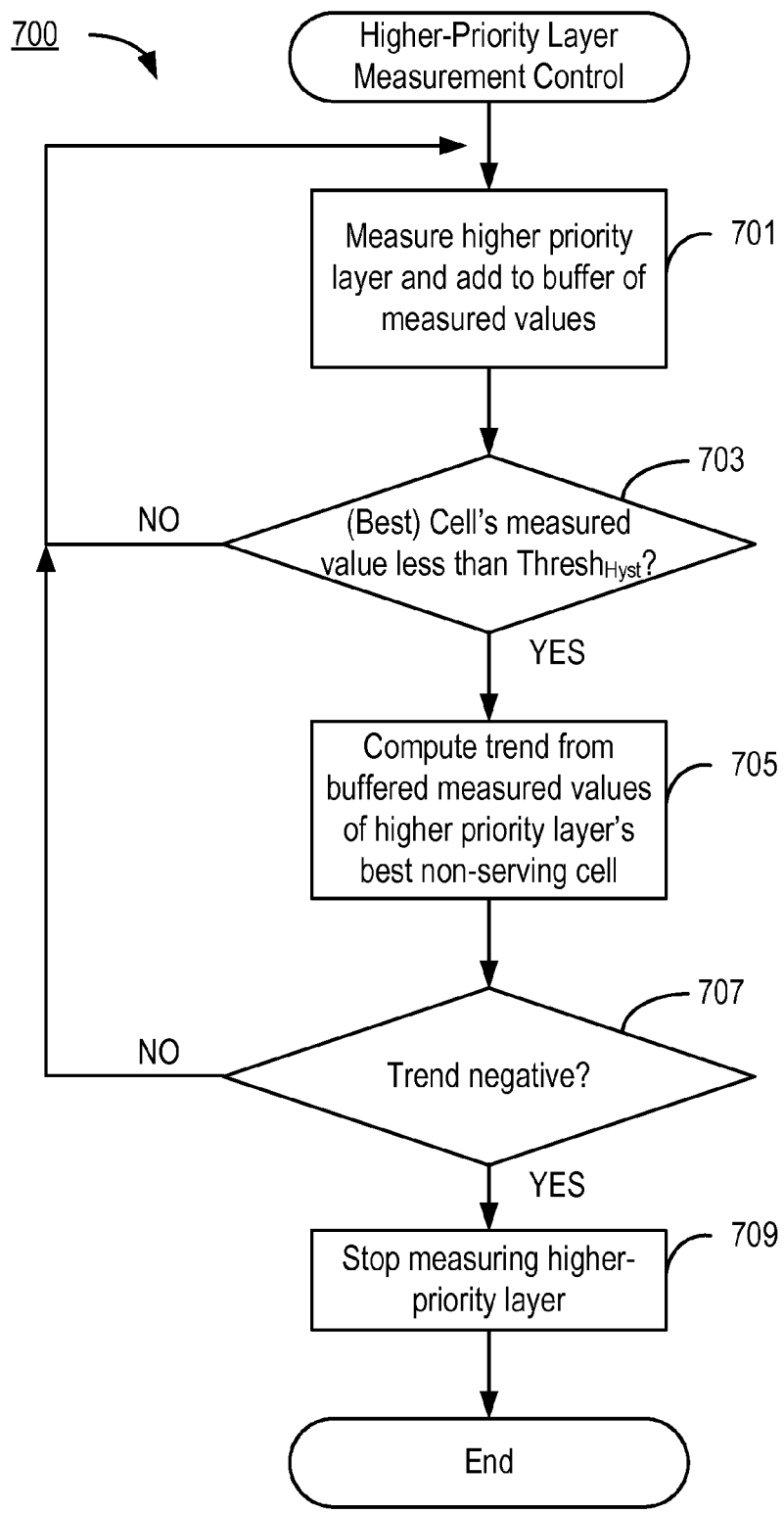
FIG. 7 is, in one respect, a flow chart of steps/processes performed by a user equipment in accordance with some but not necessarily all exemplary embodiments of the invention.

FIG. 7 is, in one respect, a flow chart of steps/processes performed by a user equipment in accordance with some but not necessarily all exemplary embodiments of the invention. In another respect, FIG. 7 can be considered to depict exemplary means 700 comprising the various illustrated circuitry (e.g., hard-wired and/or suitably programmed processor) configured to perform the described functions.

As explained earlier, a UE's operation can include making several different types of measurements for a given layer, for example measuring RSRP and also measuring RSRQ for a given layer. If either one of these indicates that the cell associated with the higher priority layer is poor, then that cell is no longer a candidate for reselection and measurements can cease. For the sake of simplicity however, FIG. 7 depicts generic logic flow that would be applied to each type measurement as though it were the only characteristic being measured. In a practical embodiment, the logic flow of FIG. 7 would be reproduced for each type of measurement made by the UE, or alternatively the logic flow would be adapted to efficiently apply the same type of logic decisions to multiple types of measurements. Either of these approaches is well within the capability of those of ordinary skill in the art basing their designs on the information provided herein.

In this exemplary embodiment, a premature switching off of measurement taking of a higher priority layer is avoided by means of several aspects. One of these involves the UE establishing a hysteresis threshold level ("$\text{Thresh}_{Hyst}$") that is a fixed (predetermined) amount (e.g., X dB) below the system defined threshold level (e.g., the "Reselection Threshold 303" shown in each of FIGS. 3-6). It should be understood that the use of the hysteresis threshold level is not an essential aspect of the invention, and some embodiments can be implemented using the system defined reselection threshold level instead of the hysteresis threshold level.

Another aspect for avoiding a premature switching off of measurement taking of a higher priority layer is the UE observing the trend of the measured surroundings for the given higher priority layer and on this basis deciding for how long the measurements on such layer should continue. Computing a trend involves processing a plurality of measurements, and it will be seen that this is incorporated into the exemplary embodiment.

Keeping in mind that more than one neighboring cell can be using radiofrequency resources on the same layer, the strategy employed in this exemplary embodiment is to halt measuring the higher priority layer if the measured surroundings of the higher priority layer is less than the applicable (i.e., hysteresis or standards-defined) threshold level, AND the trend of the higher priority layer's measurements under consideration is negative.

In some alternative embodiments, these tests are performed on the basis of measurements related to the higher priority layer's best cell. As used herein the term "best" cell is taken to mean a cell whose signals come closest to satisfying one or more predetermined criteria, such as, and without limitation, having a strongest received signal power or highest received signal quality, or lowest bit error rate. It is also possible to rank cells on one or more of these bases, and thereby identify a plural group of "best cells" (representing a subset of cells that is smaller than the group of all cells associated with the higher priority layer), even if some of the identified "best" cells are better than others.

The above-described strategy will be apparent in the following.

The exemplary embodiment depicted in FIG. 7 calls for the UE to measure a higher priority layer, and to use any of a number of possible means to preserve at least some group (e.g., without limitation 2 or 3) of these measurements (e.g., by storing them in a first-in-first-out buffer or other memory) so as to enable a trend to be calculated from these measurements as they are collected (step 701). For the sake of example, it is assumed that some sort of buffer is used to store the group of measurements. As mentioned earlier, each "measurement" can be a filtered RSRP measurement or a filtered RSRQ measurement.

The UE then ascertains whether the best measured value (e.g., from the layer's best cell) is less than the applicable threshold value (e.g., $Thresh_{Hyst}$) (decision block 703). If not ("NO" path out of decision block 703), then at least one cell's measurements are equal to or above the applicable threshold level, and measuring is permitted to continue by causing processing to revert back to step 701. In this way, the UE's mode of operation includes repeatedly measuring the higher priority layer.

If the best measured value (and therefore the measured value of the best non-serving cell associated with this layer) is less than the applicable threshold value ("YES" path out of decision block 703), then the trend of the measurements of the higher priority layer's best non-serving cell will be the final determinant of whether or not to stop measuring this layer. Similarly, in embodiments that don't focus exclusively on the best non-serving cells measurements relative to the applicable threshold level but rather determine whether any of the layer's non-serving cell's measurements have fallen below the applicable threshold level (not shown, but equivalent to "YES" path out of decision block 703), then the trend of the measurements of the best non-serving cell will be the final determinant of whether or not to stop measuring this layer. Accordingly, a trend value is ascertained from the buffered measured values associated with the layer's best non-serving cell(s) (step 705).

A number of techniques for calculating a trend from a set of data points are known, and any of these are suitable for use. A simple estimate of trend can be either:

a moving average over an uneven number of periods
a centered moving average over an even number of periods Moving averages with different time spans each tell a different story. The shorter the time span, the more sensitive the moving average will be to changes. The longer the time span, the less sensitive or the smoother the moving average will be. Moving averages are used to emphasize the direction of a trend and smooth out fluctuations or "noise" that can confuse interpretation. In order to reduce the lag in simple moving averages, technicians often use exponential moving averages (also called "EMA" or exponentially weighted moving averages). EMA is calculated by applying a percentage of the current value to a previous moving average value.

Other less common types of moving averages include triangular, variable, and weighted moving averages. Each of these is a slight deviation from the ones described above and these are used to detect different characteristics such as volatility, and weighting different time spans.

Continuing with the discussion of FIG. 7, the trend is then assessed to ascertain whether it is negative (decision block 707), which would indicate a worsening of signal strength or other quality measure. If the trend is not negative ("NO" path out of decision block 707), then measuring is permitted to continue by causing processing to revert back to step 701. Otherwise ("YES" path out of decision block 707), measuring on the higher-priority layer is stopped (step 709).

The various aspects depicted in FIG. 7 illustrate how a UE can determine whether or not to continue measuring a higher priority layer. However, the decision logic illustrated in FIG. 7 is not intended to exclude other parameters that can also warrant a UE ceasing its measurement of a higher priority layer. For example, and without limitation, a UE can additionally consider whether or not a higher priority layer is considered "allowed" (i.e., whether it is associated with a cell that the UE would be permitted to reselect to). If not, then the UE should not perform measurements on that cell.

In another example, and without limitation, the UE can additionally consider whether or not preemption has occurred during the measurement of a higher priority layer. To illustrate this case, consider an example in which the UE is capable of performing measurements on only two carriers at any given time, and assume that the UE is initially measuring only on its serving carrier, so that its measurement resources are not fully occupied. At some point, if the configuration from the network points at two other carriers (layers), both having a higher priority than that of the serving cell, then the specification requires that the UE measure each of these layers once every 120 seconds (i.e., given two layers, with one layer being measured every 60 seconds, the same layer will be revisited once every 120 seconds).

The UE in this example is already measuring its own layer, so it is only able to begin measuring on one of the two newly identified higher priority layers (for this example, call it the "first" higher priority layer). Since, after 60 seconds, the UE needs to measure the other (for this example, call it the "second") higher priority layer, and its own capabilities permit measurements of only two carriers at a time, the UE must stop measuring the first higher priority layer in order to enable it to begin measuring the second higher priority layer. In this example, measurement of the first higher priority layer is considered to have been "preempted" by measurement of the second higher priority layer.

The discussion will now focus on examples that illustrate a UE's measurement behavior when it follows the strategy as described above. In order to provide a basis for comparison, the measurement examples presented in FIGS. 3 through 6 are reproduced, but this time with different results being achieved as a result of the advantageous aspects of embodiments consistent with the invention.

Figure 8:
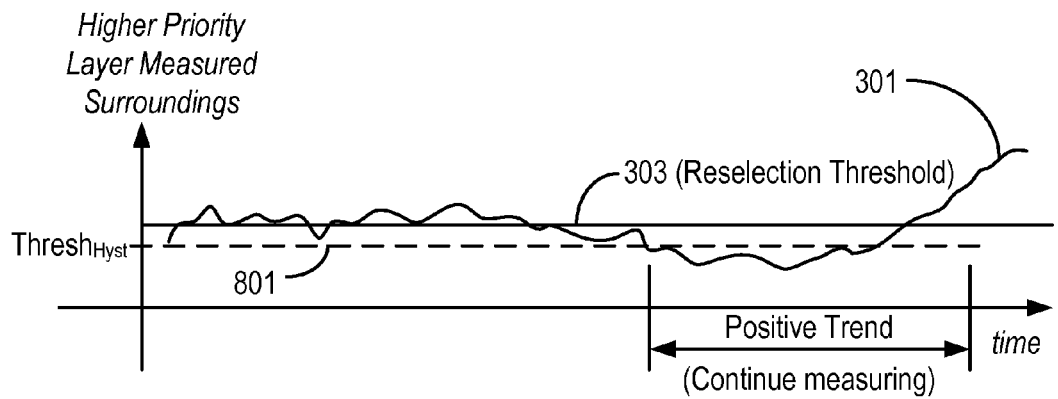
FIG. 8 illustrates a UE's exemplary decision making in accordance with an exemplary embodiment of the invention when applied to a graph of a UE's hypothetical higher priority layer measured surroundings plotted as a function of time.

Looking first at FIG. 8, this illustrates the same graph 301 as was presented in FIG. 3, and accordingly is a graph of a UE's hypothetical higher priority layer measured surroundings plotted as a function of time. It will first be observed that in this example, a hysteresis threshold level (Thresh$_{Hyst}$) 801 is being used in place of the system-defined reselection threshold 303. In accordance with an aspect of embodiments of the invention, the hysteresis threshold 801 is lower than the system-defined reselection threshold 303.

In this example, the UE continues to collect and store measurement values until the higher priority layer's best value is below the hysteresis threshold level 801. At this point, the trend is computed from the stored values, and the UE ascertains that the trend is positive (i.e., measured values are improving in strength or some other quality characteristic). Accordingly, measurement of the higher priority layer is permitted to continue. In this example, this continued measuring permits the UE to eventually detect that the higher priority layer's measurements are improving to the extent that reselection to this higher priority cell might be advantageous. By comparison, the conventional technique would have shut off measurements of this layer at the outset, thereby preventing the UE from making an advantageous cell reselection decision.

Figure 9:
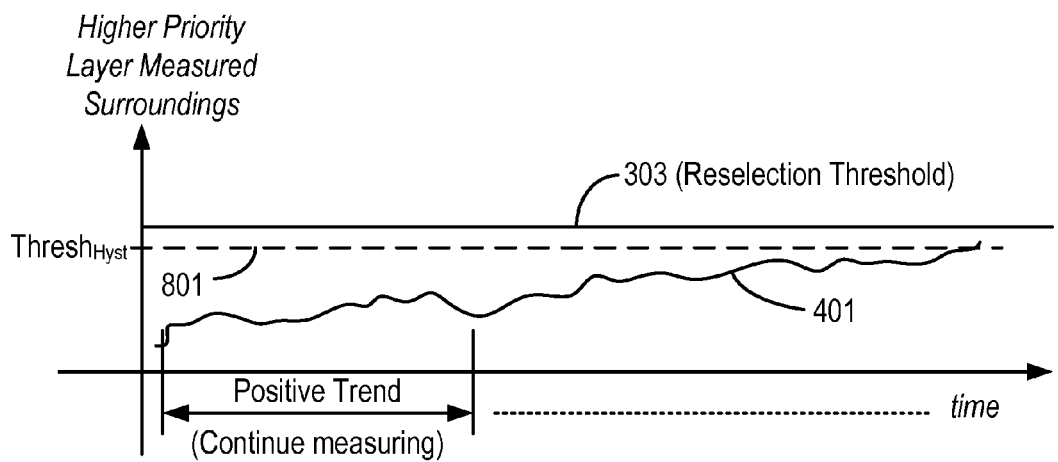
FIG. 9 illustrates a UE's exemplary decision making in accordance with an exemplary embodiment of the invention when applied to a graph of a UE's hypothetical higher priority layer measured surroundings plotted as a function of time.

Looking now at FIG. 9, this illustrates the same graph 401 as was presented in FIG. 4, and accordingly is a graph of a UE's hypothetical higher priority layer measured surroundings plotted as a function of time. In this example, as in the previous example, a hysteresis threshold level (Thresh$_{Hyst}$) 801 is being used in place of the system-defined reselection threshold 303. In accordance with an aspect of embodiments of the invention, the hysteresis threshold 801 is lower than the system-defined reselection threshold 303.

In this example, the initial measurement values collected by the UE are all below the hysteresis threshold value 801. Accordingly, the UE must examine the trend of these values to decide whether or not to continue measuring this higher priority layer. In this example, although the initially collected values are all below the hysteresis threshold level 801 (and therefore also below the system-defined reselection threshold level 303), the trend of these values is positive, so measuring is permitted to continue. This turns out to be to the UE's advantage because the UE is able to later detect the measurement values crossing both the hysteresis threshold level 801 and the system-defined reselection threshold level 303. This detection enables the UE to possibly conclude that it should reselect to the cell associated with the higher priority layer. By comparison, the conventional technique would have shut off measurements of this layer at the outset, thereby preventing the UE from making an advantageous cell reselection decision.

Figure 10:
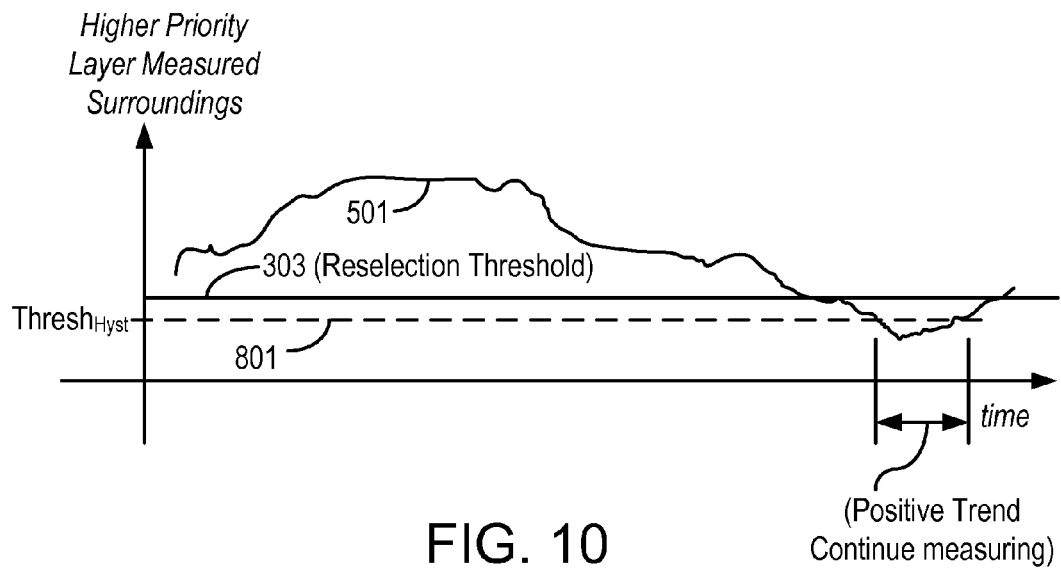
FIG. 10 illustrates a UE's exemplary decision making in accordance with an exemplary embodiment of the invention when applied to a graph of a UE's hypothetical higher priority layer measured surroundings plotted as a function of time.

Looking now at FIG. 10, this illustrates the same graph 501 as was presented in FIG. 5, and accordingly is a graph of a UE's hypothetical higher priority layer measured surroundings plotted as a function of time. In this example, as in the previous examples, a hysteresis threshold level (Thresh$_{Hyst}$) 801 is being used in place of the system-defined reselection threshold 303. In accordance with an aspect of embodiments of the invention, the hysteresis threshold 801 is lower than the system-defined reselection threshold 303.

In this example, the initial measurement values collected by the UE are all above the hysteresis threshold level 801, so measurement continues. Since the measurement values are also above the standards-defined reselection threshold level 303, the behavior would be the same following the conventional techniques. As measuring proceeds, the measurement values dip first below the standards-defined reselection threshold 303, and then below the hysteresis threshold level 801.

The measurement value dipping below the hysteresis threshold level 801 triggers the UE's determining the trend of measurement values now being collected. Upon examination, in this example, the UE ascertains that the trend is positive. Accordingly, measurement of the higher priority layer is permitted to continue. In this example, this continued measuring permits the UE to eventually detect that the higher priority layer's measurements are improving to the extent that reselection to this higher priority cell might be advantageous. By comparison, the conventional technique would have shut off measurements of this layer at the switch-off point 503, thereby preventing the UE from making an advantageous cell reselection decision.

Figure 11:
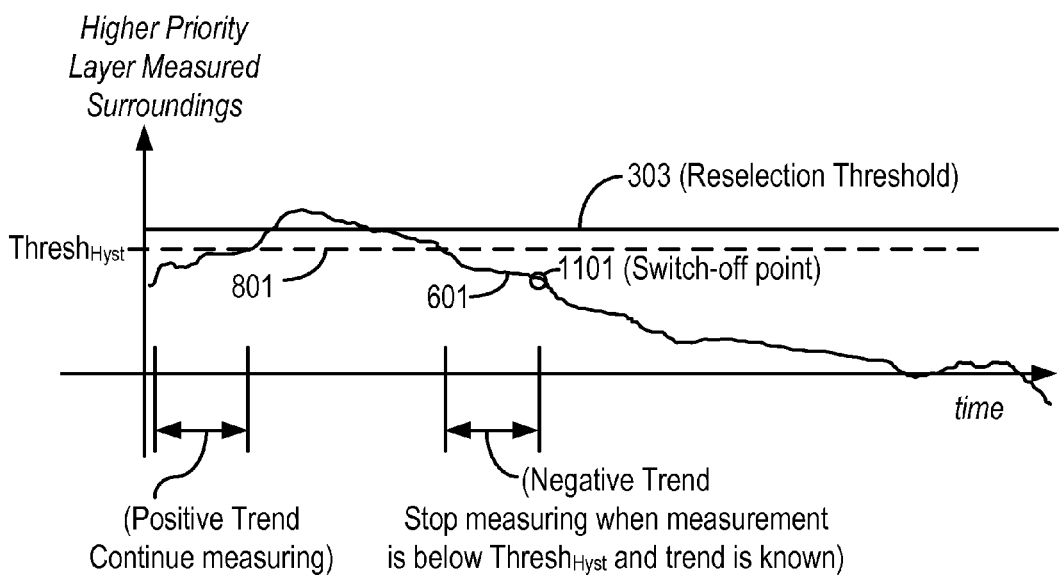
FIG. 11 illustrates a UE's exemplary decision making in accordance with an exemplary embodiment of the invention when applied to a graph of a UE's hypothetical higher priority layer measured surroundings plotted as a function of time.

Looking now at FIG. 11, this illustrates the same graph 601 as was presented in FIG. 6, and accordingly is a graph of a UE's hypothetical higher priority layer measured surroundings plotted as a function of time. In this example, as in the previous examples, a hysteresis threshold level (Thresh$_{Hyst}$) 801 is being used in place of the system-defined reselection threshold 303. In accordance with an aspect of embodiments of the invention, the hysteresis threshold 801 is lower than the system-defined reselection threshold 303.

In this example, the initial measurement values collected by the UE are all below the hysteresis threshold level 801. However, the initial trend is positive, so unlike the example of FIG. 6, measurement of the higher priority layer continues. Eventually, however, the measurement values decline and pass below the system-defined reselection threshold 303 and then the hysteresis threshold level 801. When the measurement values are below the hysteresis threshold level 801, the trend of the measurement values is found and it is ascertained whether this trend is negative or positive. In this instance the trend is negative, so measuring of this higher-priority layer is discontinued. This is depicted as occurring at the switch-off point 1101. It will be observed that the results here (i.e., a decision to cease measuring) is the same as the decision in accordance with conventional techniques (see FIG. 6), so there is no disadvantage to practicing the inventive techniques.

It should be understood that the trend intervals variously shown in each of FIGS. 8, 9, 10, and 11 are for purposes of illustrating principles that are operative in exemplary embodiments consistent with the invention. The actual length of any of these intervals in any particular embodiment could be shorter or longer than that which is depicted.

Figure 12:
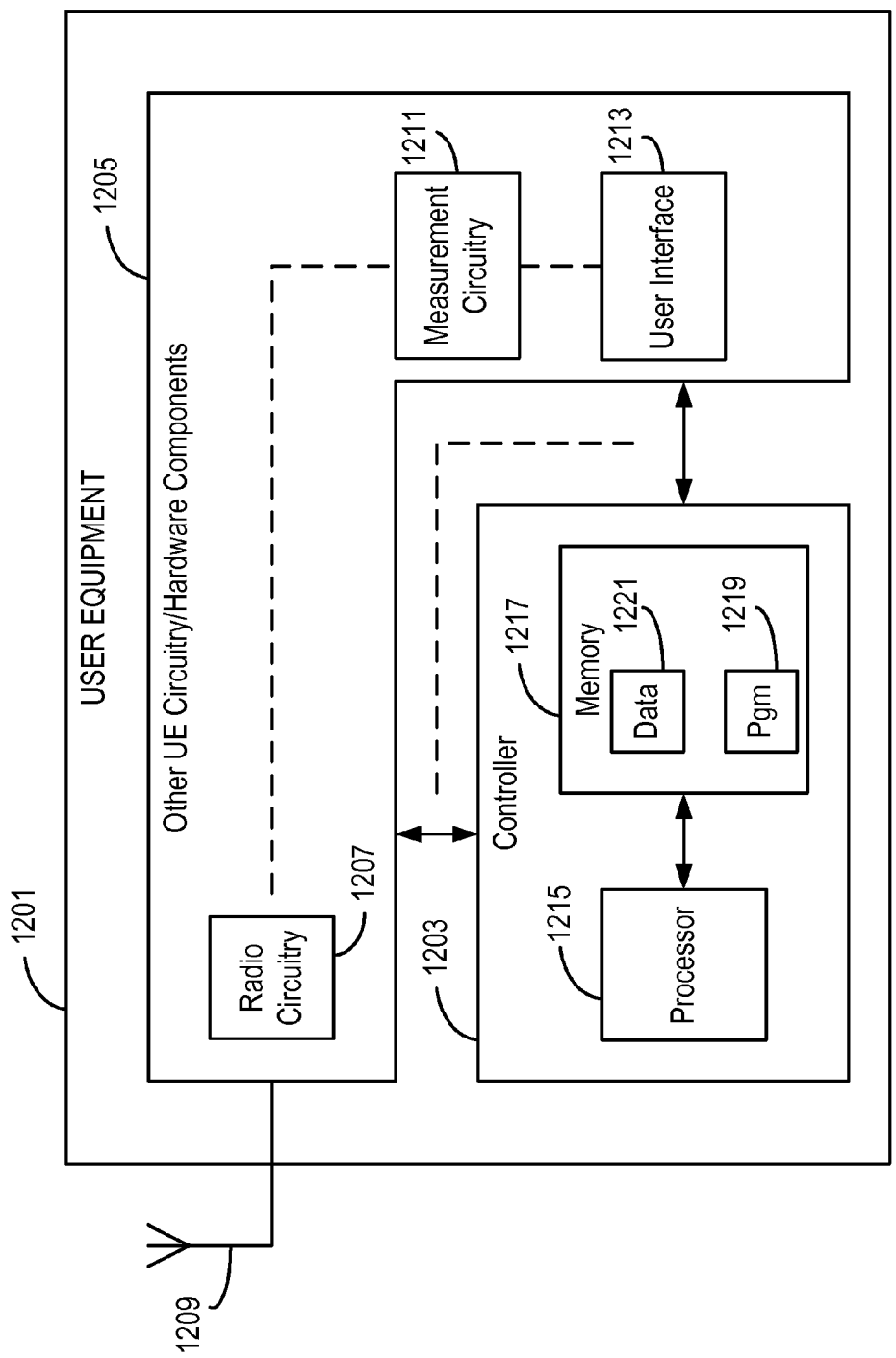
FIG. 12 is a block diagram of a user equipment in accordance with some exemplary embodiments of the invention.

FIG. 12 is a block diagram of a user equipment 1201 configured to carry out, in addition to typical user equipment functionality, functionality in accordance with embodiments of the invention such as those aspects illustrated in connection with FIGS. 7 through 11 above. The user equipment 1201 includes a controller 1203 coupled to other User Equipment (UE) circuitry/hardware components 1205 that enable the user equipment 1201 to perform its application-specific functionality (e.g., operating as a mobile telephone in a cellular communication system). The other user equipment circuitry/hardware components 1205 are generally known in the art, and may include such elements as, for example and without limitation, radio circuitry 1207 coupled to one or more antennas 1209, and measurement circuitry 1211 for making the various measurements described herein. It will be appreciated that, for the sake of illustration, the measurement circuitry 1211 is depicted as being separate and apart from the radio circuitry 1207. However, in some embodiments these may be integrated together in a way so as to prevent such neat partitioning. The other user equipment circuitry/hardware components 1205 may also include some sort of user interface (e.g., display, keyboard, switch(es)) 1213.

The controller 1203 includes circuitry configured to carry out any one or any combination of the aspects described above with respect to higher-priority layer measurement actions. Such circuitry could, for example, be entirely hardwired circuitry (e.g., one or more ASICs). Depicted in the exemplary embodiment of FIG. 12, however, is programmable circuitry, comprising a processor 1215 coupled to one or more memory devices 1217 (e.g., Random Access Memory, Magnetic Disc Drives, Optical Disk Drives, Read Only Memory, etc.). The memory device(s) store program means 1219 (e.g., a set of processor instructions) configured to cause the processor 1215 to control the other user equipment circuitry/hardware components 1205 so as to carry out any of the higher-priority layer measurement aspects described above. The memory 1217 may also store data 1221 representing various constant and variable parameters (e.g., measurement values) as may be needed by the processor 1215 when carrying out its functions such as those specified by the program means 1219.

The various aspects of embodiments consistent with the invention as described above provide solutions to the problems relating to when to switch off measurement of a higher-priority layer. In particular, embodiments consistent with the invention can avoid a premature switching-off of such measurements compared with conventional measurement techniques.

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment in a cellular communication system in which radiofrequency resources are partitioned into layers, each layer being associated with one of a set of hierarchical priority levels, the method comprising:
    while camped on a serving cell whose signals are transmitted on a first layer associated with a first priority level, repeatedly measuring a characteristic of a second layer that is present within the surroundings of the user equipment and generating from these measurements a plurality of measured surroundings data, wherein the second layer is associated with a second priority level that is higher than the first priority level; and
    ceasing measuring the characteristic of the second layer that is present within the surroundings of the user equipment in response to detecting both that at least one of the measured surroundings data is less than a predetermined threshold level and that a trend of the plurality of measured surroundings data is negative.

2. The method of claim 1, wherein each of the plurality of measured surroundings data is generated by filtering a plurality of initial measured surroundings data.

3. The method of claim 1, wherein measuring the characteristic of the second layer that is present within the surroundings of the user equipment is performed only if at least one non-serving cell associated with the second layer is an allowed candidate for cell reselection by the user equipment within the cellular communication system.

4. The method of claim 1, wherein:
    the user equipment's surroundings include signals transmitted by a plurality of non-serving cells all associated with the second layer;
    one of the plurality of non-serving cells all associated with the second layer is defined as a best non-serving cell as a result of that non-serving cell's signals coming closest to satisfying one or more predetermined criteria; and
    each of the measured surroundings data represents a measured value of the best non-serving cell in the user equipment's surroundings.

5. The method of claim 1, wherein:
    the user equipment's surroundings include signals transmitted by a plurality of non-serving cells all associated with the second layer;
    a predefined plural number but not all of the plurality of non-serving cells all associated with the second layer are defined as best non-serving cells as a result of those non-serving cell's signals coming closest to satisfying one or more predetermined criteria; and
    each of the measured surroundings data represents an average of measured values of the predefined plural number of best non-serving cells in the user equipment's surroundings.

6. The method of claim 1, wherein:
    the user equipment's surroundings include signals transmitted by a plurality of non-serving cells all associated with the second layer;
    a predefined plural number but not all of the plurality of non-serving cells all associated with the second layer are defined as best non-serving cells as a result of those non-serving cell's signals coming closest to satisfying one or more predetermined criteria; and
    each of the measured surroundings data represents a weighted average of measured values of the predefined plural number of best non-serving cells in the user equipment's surroundings.

7. The method of claim 1, wherein:
    the user equipment's surroundings include signals transmitted by a plurality of non-serving cells all associated with the second layer;
    a predefined plural number but not all of the plurality of non-serving cells all associated with the second layer are defined as best non-serving cells as a result of those non-serving cell's signals coming closest to satisfying one or more predetermined criteria; and
    each of the measured surroundings data represents a weighted sum of measured values of the predefined plural number of best non-serving cells in the user equipment's surroundings.

8. The method of claim 1, wherein the predetermined threshold level is lower than a threshold level mandated by the cellular communication system.

9. The method of claim 1, wherein:
the user equipment's surroundings include signals transmitted by a plurality of non-serving cells all associated with the second layer;
one of the plurality of non-serving cells all associated with the second layer is defined as a best non-serving cell as a result of that non-serving cell's signals coming closest to satisfying one or more predetermined criteria; and
detecting that at least one of the measured surroundings data is less than the predetermined threshold level consists of detecting that measured surroundings data from the best non-serving cell is less than the predetermined threshold level.

10. The method of claim 1, wherein:
the user equipment's surroundings include signals transmitted by a plurality of non-serving cells all associated with the second layer;
one of the plurality of non-serving cells all associated with the second layer is defined as a best non-serving cell as a result of that non-serving cell's signals coming closest to satisfying one or more predetermined criteria; and
detecting that the trend of the plurality of measured surroundings data is negative consists of detecting that the trend of the plurality of measured surroundings data from the best non-serving cell is negative.

11. An apparatus for operating a user equipment in a cellular communication system in which radiofrequency resources are partitioned into layers, each layer being associated with one of a set of hierarchical priority levels, the apparatus comprising:
circuitry configured to, while camped on a serving cell whose signals are transmitted on a first layer associated with a first priority level, repeatedly measure a characteristic of a second layer that is present within the surroundings of the user equipment and to generate from these measurements a plurality of measured surroundings data, wherein the second layer is associated with a second priority level that is higher than the first priority level; and
circuitry configured to cause a cessation of measuring the characteristic of the second layer that is present within the surroundings of the user equipment in response to detecting both that at least one of the measured surroundings data is less than a predetermined threshold level and that a trend of the plurality of measured surroundings data is negative.

12. The apparatus of claim 11, wherein the circuitry configured to generate the plurality of measured surroundings data comprises circuitry configured to generate each of the plurality of measured surroundings data by filtering a plurality of initial measured surroundings data.

13. The apparatus of claim 11, wherein the circuitry configured to measure the characteristic of the second layer that is present within the surroundings of the user equipment is configured to operate only if at least one non-serving cell associated with the second layer is an allowed candidate for cell reselection by the user equipment within the cellular communication system.

14. The apparatus of claim 11, wherein:
the user equipment's surroundings include signals transmitted by a plurality of non-serving cells all associated with the second layer;
the apparatus comprises circuitry configured to identify a best non-serving cell, wherein one of the plurality of non-serving cells all associated with the second layer is defined as the best non-serving cell as a result of that non-serving cell's signals coming closest to satisfying one or more predetermined criteria; and
each of the measured surroundings data represents a measured value of the best non-serving cell in the user equipment's surroundings.

15. The apparatus of claim 11, wherein:
the user equipment's surroundings include signals transmitted by a plurality of non-serving cells all associated with the second layer;
the apparatus comprises circuitry configured to identify a predefined plural number of best non-serving cells, wherein the predefined plural number of best non-serving cells does not include all of the plurality of non-serving cells all associated with the second layer, and wherein the predefined plural number of best non-serving cells are defined as best non-serving cells as a result of those non-serving cell's signals coming closest to satisfying one or more predetermined criteria; and
each of the measured surroundings data represents an average of measured values of the predefined plural number of best non-serving cells in the user equipment's surroundings.

16. The apparatus of claim 11, wherein:
the user equipment's surroundings include signals transmitted by a plurality of non-serving cells all associated with the second layer;
the apparatus comprises circuitry configured to identify a predefined plural number of best non-serving cells, wherein the predefined plural number of best non-serving cells does not include all of the plurality of non-serving cells all associated with the second layer, and wherein the predefined plural number of best non-serving cells are defined as best non-serving cells as a result of those non-serving cell's signals coming closest to satisfying one or more predetermined criteria; and
each of the measured surroundings data represents a weighted average of measured values of the predefined plural number of best non-serving cells in the user equipment's surroundings.

17. The apparatus of claim 11, wherein:
the user equipment's surroundings include signals transmitted by a plurality of non-serving cells all associated with the second layer;
the apparatus comprises circuitry configured to identify a predefined plural number of best non-serving cells, wherein the predefined plural number of best non-serving cells does not include all of the plurality of non-serving cells all associated with the second layer, and wherein the predefined plural number of best non-serving cells are defined as best non-serving cells as a result of those non-serving cell's signals coming closest to satisfying one or more predetermined criteria; and
each of the measured surroundings data represents a weighted sum of measured values of the predefined plural number of best non-serving cells in the user equipment's surroundings.

18. The apparatus of claim 11, wherein the predefined threshold level is lower than a threshold level mandated by the cellular communication system.

19. The apparatus of claim 11, wherein:
the user equipment's surroundings include signals transmitted by a plurality of non-serving cells all associated with the second layer;
the apparatus comprises circuitry configured to identify a best non-serving cell, wherein one of the plurality of non-serving cells all associated with the second layer is defined as the best non-serving cell as a result of that non-serving cell's signals coming closest to satisfying one or more predetermined criteria; and the circuitry configured to cause cessation of measuring the characteristic of the second layer that is present within the surroundings of the user equipment is configured to consider only measured surroundings data associated with the best non-serving cell.

\* \* \* \* \*